(12) United States Patent
Ouyang et al.

(10) Patent No.: US 11,025,285 B2
(45) Date of Patent: Jun. 1, 2021

(54) ELECTRONIC DEVICE WITH MILLIMETER WAVE ANTENNAS

(71) Applicant: Apple Inc., Cupertino, CA (US)

(72) Inventors: Yuehui Ouyang, Sunnyvale, CA (US); Yi Jiang, Cupertino, CA (US); Matthew A. Mow, Los Altos, CA (US); Basim Noori, Scotts Valley, CA (US); Mattia Pascolini, San Francisco, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/854,771

(22) Filed: Apr. 21, 2020

(65) Prior Publication Data

US 2020/0295789 A1   Sep. 17, 2020

Related U.S. Application Data

(63) Continuation of application No. 16/138,881, filed on Sep. 21, 2018, now Pat. No. 10,680,663, which is a (Continued)

(51) Int. Cl.
*H04B 1/04* (2006.01)
*H01Q 1/22* (2006.01)
(Continued)

(52) U.S. Cl.
CPC ............. *H04B 1/04* (2013.01); *H01Q 1/2266* (2013.01); *H01Q 1/243* (2013.01);
(Continued)

(58) Field of Classification Search
CPC .. H01Q 1/2266; H01Q 1/243; H01Q 21/0025; H01Q 21/062; H01Q 21/065;
(Continued)

(56) References Cited

U.S. PATENT DOCUMENTS

| 4,158,193 A | 6/1979 | D'Antonio et al. |
| 5,231,407 A | 7/1993 | McGirr et al. |

(Continued)

FOREIGN PATENT DOCUMENTS

| CN | 1336044 A | 2/2002 |
| CN | 101471711 A | 7/2009 |

(Continued)

*Primary Examiner* — Hai V Nguyen
(74) *Attorney, Agent, or Firm* — Treyz Law Group, P.C.; G. Victor Treyz; Michael H. Lyons

(57) ABSTRACT

An electronic device may be provided with wireless circuitry. The wireless circuitry may include one or more antennas. The antennas may include phased antenna arrays each of which includes multiple antenna elements. Phased antenna arrays may be mounted along edges of a housing for the electronic device, behind a dielectric window such as a dielectric logo window in the housing, in alignment with dielectric housing portions at corners of the housing, or elsewhere in the electronic device. A phased antenna array may include arrays of patch antenna elements on dielectric layers separated by a ground layer. A baseband processor may distribute wireless signals to the phased antenna arrays at intermediate frequencies over intermediate frequency signal paths. Transceiver circuits at the phased antenna arrays may include upconverters and downconverters coupled to the intermediate frequency signal paths.

20 Claims, 13 Drawing Sheets

Related U.S. Application Data continuation of application No. 15/499,745, filed on Apr. 27, 2017, now Pat. No. 10,084,490, which is a continuation of application No. 15/097,868, filed on Apr. 13, 2016, now Pat. No. 9,667,290.

(60) Provisional application No. 62/149,430, filed on Apr. 17, 2015.

(51) Int. Cl.
| | | |
|---|---|---|
| *H01Q 1/24* | (2006.01) | |
| *H01Q 21/00* | (2006.01) | |
| *H01Q 21/06* | (2006.01) | |
| *H01Q 21/28* | (2006.01) | |
| *H04B 1/10* | (2006.01) | |
| *H04B 1/03* | (2006.01) | |

(52) U.S. Cl.
CPC ....... *H01Q 21/0025* (2013.01); *H01Q 21/062* (2013.01); *H01Q 21/065* (2013.01); *H01Q 21/28* (2013.01); *H04B 1/03* (2013.01); *H04B 1/1081* (2013.01); *H04B 2001/0408* (2013.01)

(58) Field of Classification Search
CPC ........ H01Q 21/28; H04B 1/03; H04B 1/1081; H04B 2001/0408
USPC .............................. 455/562.1, 575.7, 88, 101
See application file for complete search history.

(56) References Cited

U.S. PATENT DOCUMENTS

| | | | | |
|---|---|---|---|---|
| 5,561,434 | A * | 10/1996 | Yamazaki | H01Q 3/30 342/372 |
| 5,982,250 | A | 11/1999 | Hung et al. | |
| 7,812,775 | B2 | 10/2010 | Babakhani | |
| 7,852,281 | B2 * | 12/2010 | Choudhury | H01Q 23/00 343/851 |
| 8,120,537 | B2 * | 2/2012 | del Rio | H01Q 21/0087 343/700 MS |
| 8,374,558 | B2 * | 2/2013 | Lambrecht | H01Q 21/0006 455/90.3 |
| 8,412,130 | B2 | 4/2013 | Suematsu et al. | |
| 8,489,162 | B1 | 7/2013 | Dou et al. | |
| 8,760,352 | B2 * | 6/2014 | Rao | H01Q 21/28 343/702 |
| 8,768,411 | B2 | 7/2014 | Tinsely et al. | |
| 9,343,817 | B2 | 5/2016 | Pan | |
| 9,667,290 | B2 * | 5/2017 | Ouyang | H01Q 21/0025 |
| 9,673,916 | B2 * | 6/2017 | Mow | H04B 17/19 |
| 9,742,070 | B2 | 8/2017 | Zhou et al. | |
| 9,960,864 | B2 * | 5/2018 | Mow | H04B 17/19 |
| 10,084,490 | B2 * | 9/2018 | Ouyang | H01Q 1/2266 |
| 10,205,224 | B2 * | 2/2019 | Mow | H01Q 9/0421 |
| 10,361,476 | B2 | 7/2019 | Ou | |
| 10,454,596 | B2 * | 10/2019 | Mow | H04B 17/19 |
| 10,455,065 | B2 * | 10/2019 | Lee | H01Q 21/065 |
| 10,680,663 | B2 * | 6/2020 | Ouyang | H01Q 1/2266 |
| 2005/0156780 | A1 * | 7/2005 | Bonthron | G01S 13/931 342/107 |
| 2006/0139210 | A1 | 6/2006 | Stavros et al. | |
| 2009/0140943 | A1 | 6/2009 | Ratni | |
| 2009/0322643 | A1 * | 12/2009 | Choudhury | H01Q 1/526 343/851 |
| 2010/0052994 | A1 * | 3/2010 | Llorens del Rio | H01Q 21/0087 343/700 MS |
| 2010/0167666 | A1 | 7/2010 | Choudhury et al. | |
| 2011/0006953 | A1 | 1/2011 | Chiang et al. | |
| 2011/0032050 | A1 | 2/2011 | Kouki et al. | |
| 2011/0250928 | A1 | 11/2011 | Schlub et al. | |
| 2012/0182893 | A1 | 7/2012 | Trainin et al. | |
| 2012/0235881 | A1 * | 9/2012 | Pan | H04B 7/0413 343/893 |
| 2012/0309325 | A1 | 12/2012 | Carbone et al. | |
| 2013/0202308 | A1 | 8/2013 | Middleton et al. | |
| 2013/0217336 | A1 | 8/2013 | McCormack et al. | |
| 2013/0278468 | A1 | 10/2013 | Yehezkely et al. | |
| 2013/0293420 | A1 | 11/2013 | Yehezkely | |
| 2014/0112511 | A1 | 4/2014 | Corbin et al. | |
| 2014/0145879 | A1 | 5/2014 | Pan | |
| 2014/0203969 | A1 | 7/2014 | Maltsev et al. | |
| 2014/0320344 | A1 | 10/2014 | Sanderovich et al. | |
| 2015/0035714 | A1 | 2/2015 | Zhou | |
| 2015/0070228 | A1 | 3/2015 | Gu et al. | |
| 2015/0087522 | A1 | 3/2015 | Kawaguchi et al. | |
| 2015/0099474 | A1 | 4/2015 | Yarga et al. | |
| 2015/0116169 | A1 | 4/2015 | Ying | |
| 2015/0188218 | A1 | 7/2015 | Elsherbini et al. | |
| 2015/0280318 | A1 | 10/2015 | Yang et al. | |
| 2015/0333724 | A1 | 11/2015 | Lahti et al. | |
| 2016/0308563 | A1 * | 10/2016 | Ouyang | H04B 1/03 |
| 2017/0302306 | A1 * | 10/2017 | Ouyang | H01Q 1/2266 |
| 2018/0219296 | A1 | 8/2018 | Chi et al. | |
| 2019/0020365 | A1 * | 1/2019 | Ouyang | H01Q 1/2283 |
| 2020/0295789 | A1 * | 9/2020 | Ouyang | H01Q 21/28 |

FOREIGN PATENT DOCUMENTS

| | | |
|---|---|---|
| CN | 101958454 A | 1/2011 |
| CN | 101958455 A | 1/2011 |
| CN | 102013554 A | 4/2011 |
| CN | 202025842 U | 11/2011 |
| CN | 103326115 A | 9/2013 |
| CN | 103684506 A | 3/2014 |
| CN | 104428945 A | 3/2015 |
| CN | 105259536 A | 1/2016 |
| CN | 105390814 A | 3/2016 |
| EP | 2068394 B1 | 6/2009 |
| EP | 2276109 A1 | 1/2011 |
| EP | 2296222 B1 | 3/2011 |
| EP | 3132448 B1 | 10/2018 |
| WO | 2009029520 A1 | 3/2009 |

* cited by examiner

ELECTRONIC DEVICE WITH MILLIMETER WAVE ANTENNAS

This application is a continuation of patent application Ser. No. 16/138,881, filed on Sep. 21, 2018, which is a continuation of patent application Ser. No. 15/499,745, filed on Apr. 27, 2017, which is a continuation of patent application Ser. No. 15/097,868, filed on Apr. 13, 2016, which claims the benefit of provisional patent application No. 62/149,430, filed Apr. 17, 2015, which are incorporated by reference herein in their entireties.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave communications bands. Millimeter wave communications, which are sometimes referred to as extremely high frequency (EHF) communications, involve communications at frequencies of about 10-400 GHz. Operation at these frequencies may support high bandwidths, but may raise significant challenges. For example, millimeter wave communications are typically line-of-sight communications and can be characterized by substantial attenuation during signal propagation.

It would therefore be desirable to be able to provide electronic devices with improved wireless communications circuitry such as communications circuitry that supports millimeter wave communications.

SUMMARY

An electronic device may be provided with wireless circuitry. The wireless circuitry may include one or more antennas. The antennas may include phased antenna arrays each of which includes multiple antenna elements. The phased antenna arrays may be used to handle millimeter wave wireless communications and may perform beam steering operations.

Phased antenna arrays may be mounted along edges of a housing for the electronic device, behind a dielectric logo or other antenna window in a rear face of the housing, may be mounted in alignment with dielectric housing portions at corners of a housing, or may be incorporated elsewhere in an electronic device. A baseband processor may distribute wireless signals to the phased antenna arrays at intermediate frequencies over intermediate frequency signal paths. Transceiver circuits at the phased antenna arrays may include upconverters and downconverters coupled to the intermediate frequency signal paths. This arrangement allows path losses to be minimized by distributing signals to the phased antenna arrays at intermediate frequencies and locally converting the intermediate frequency signals to radio-frequency signals for the antennas.

A phased antenna array may include one or more arrays of patch antenna elements. With one suitable arrangement, a phased antenna array may have first and second patch antenna arrays supported by dielectric layers that are separated by an interposed ground layer. Transceiver circuit components may be mounted to one of the dielectric layers to form an integral antenna array and transceiver circuit module. This type of phased antenna array may be mounted at the corners of an electronic device housing and may operate through the front and rear surfaces of the device.

DETAILED DESCRIPTION

Figure 1:
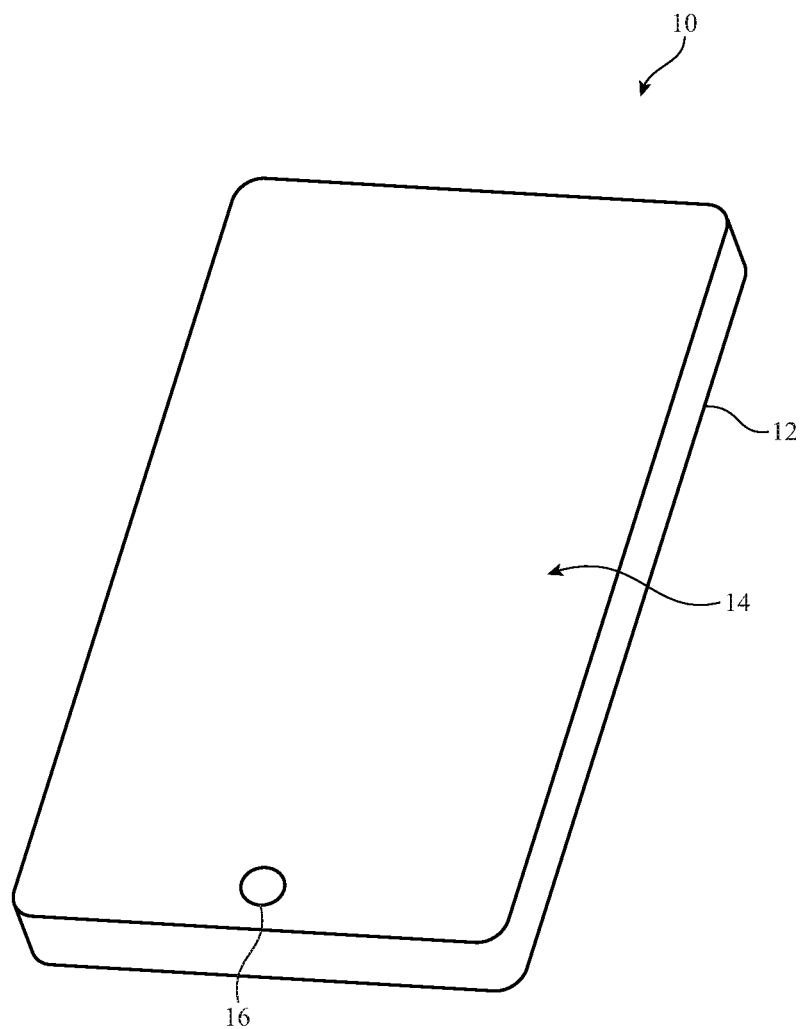
FIG. 1 is a perspective view of an illustrative electronic device with wireless communications circuitry in accordance with an embodiment.

An electronic device such as electronic device 10 of FIG. 1 may contain wireless circuitry. The wireless circuitry may include one or more antennas. The antennas may include phased antenna arrays that are used for handling millimeter wave communications. Millimeter wave communications, which are sometimes referred to as extremely high frequency (EHF) communications, involve signals at 60 GHz or other frequencies between about 10 GHz and 400 GHz. If desired, device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. An opening may also be formed in the display cover layer to accommodate ports such as a speaker port. Openings may be formed in housing 12 to form communications ports (e.g., an audio jack port, a digital data port, etc.). Openings in housing 12 may also be formed for audio components such as a speaker and/or a microphone.

Antennas may be mounted in housing 12. To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when an antenna (or set of antennas) is being adversely affected due to the orientation of housing 12, blockage by a user's hand or other external object, or other environmental factors. Device 10 can then switch an antenna (or set of antennas) into use in place of the antennas that are being adversely affected.

Antennas may be mounted along the peripheral edges of housing 12, on the rear of housing 12, under the display cover glass or other dielectric display cover layer that is used in covering and protecting display 14 on the front of device 10, under a dielectric window on a rear face of housing 12 or the edge of housing 12, or elsewhere in device 10.

Figure 2:
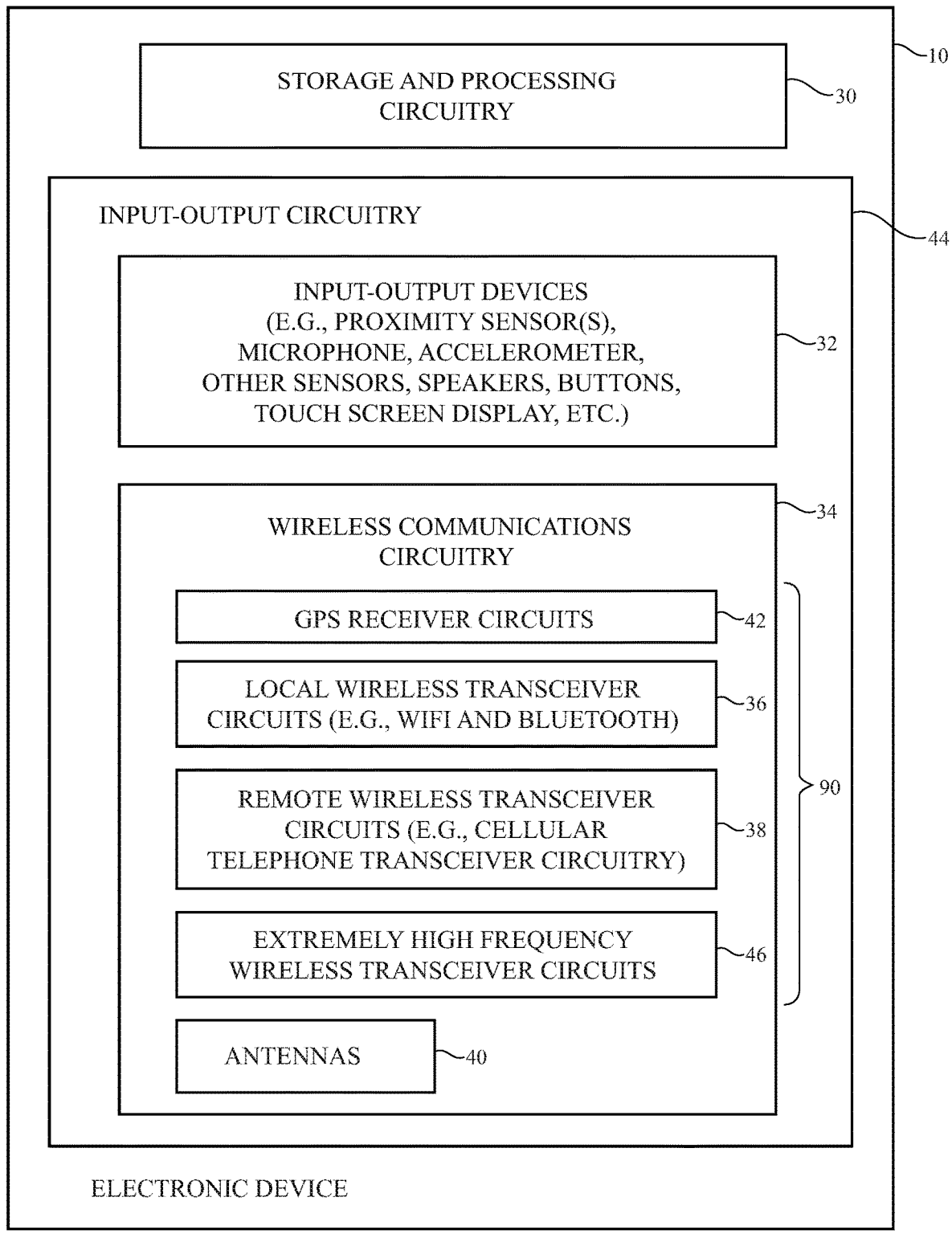
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processor integrated circuits, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether device 10 is mounted in a dock, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, 42, and 46.

Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band.

Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Millimeter wave transceiver circuitry 46 may support communications at extremely high frequencies (e.g., millimeter wave frequencies from 10 GHz to 400 GHz or other millimeter wave frequencies).

Wireless communications circuitry 34 may include satellite navigation system circuitry such as Global Positioning System (GPS) receiver circuitry 42 for receiving GPS signals at 1575 MHz or for handling other satellite positioning data (e.g., GLONASS signals at 1609 MHz). Satellite navigation system signals for receiver 42 are received from a constellation of satellites orbiting the earth.

In satellite navigation system links, cellular telephone links, and other long-range links, wireless signals are typically used to convey data over thousands of feet or miles. In WiFi® and Bluetooth® links and other short-range wireless links, wireless signals are typically used to convey data over tens or hundreds of feet. Extremely high frequency (EHF) wireless transceiver circuitry 46 may convey signals over these short distances that travel between transmitter and receiver over a line-of-sight path. To enhance signal reception for millimeter wave communications, phased antenna arrays and beam steering techniques may be used. Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include phased antenna arrays for handling millimeter wave communications.

Transmission line paths may be used to route antenna signals within device 10. For example, transmission line paths may be used to couple antenna structures 40 to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. The antennas may be used together or one of the antennas may be switched into use while other antenna(s) are switched out of use. If desired, control circuitry 30 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40.

In some configurations, antennas 40 may include antenna arrays (e.g., phased antenna arrays to implement beam steering functions). For example, the antennas that are used in handling millimeter wave signals for extremely high frequency wireless transceiver circuits 46 may be implemented as phased antenna arrays. The radiating elements in a phased antenna array for supporting millimeter wave communications may be patch antennas, dipole antennas, or other suitable antenna elements. Transceiver circuitry can be integrated with the phased antenna arrays to form integrated phased antenna array and transceiver circuit modules.

In devices such as handheld devices, the presence of an external object such as the hand of a user or a table or other surface on which a device is resting has a potential to block wireless signals such as millimeter wave signals. Accordingly, it may be desirable to incorporate multiple phased antenna arrays into device 10, each of which is placed in a different location within device 10. With this type of arrangement, an unblocked phased antenna array may be switched into use and, once switched into use, the phased antenna array may use beam steering to optimize wireless performance. Configurations in which antennas from one or more different locations in device 10 are operated together may also be used (e.g., to form a phased antenna array, etc.).

Figure 3:
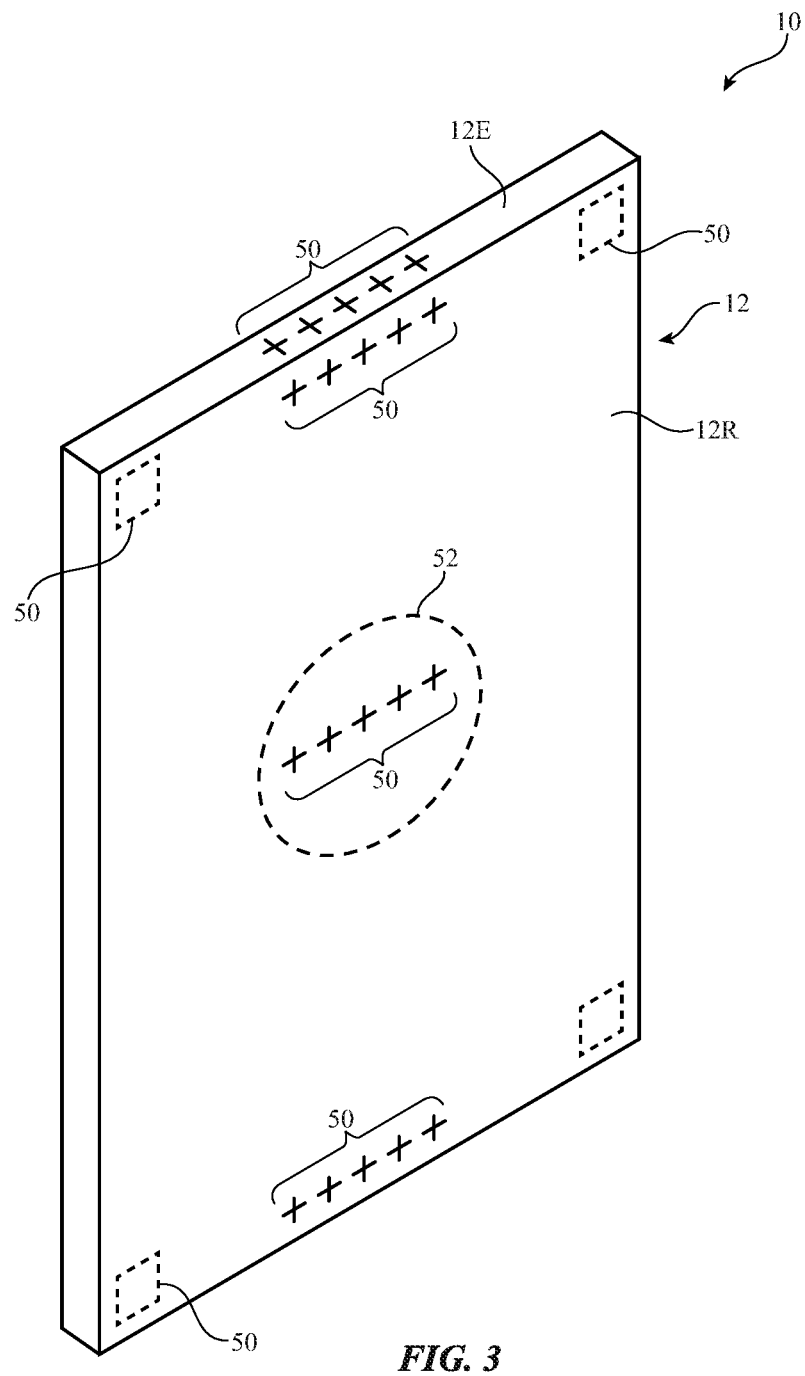
FIG. 3 is a perspective view of an illustrative electronic device showing illustrative locations at which antenna arrays for millimeter wave communications may be located in accordance with an embodiment.

FIG. 3 is a perspective view of electronic device showing illustrative locations 50 in which antennas 40 (e.g., single antennas and/or phased antenna arrays for use with wireless circuitry 34 such as millimeter wave wireless transceiver circuitry 46) may be mounted in device 10. As shown in FIG. 3, antennas 40 may be mounted at the corners of device 10, along the edges of housing 12 such as edge 12E, on the upper and lower portions of rear housing portion 12R, in the center of rear housing 12 (e.g., under a dielectric window structure such as plastic logo 52), etc. In configurations in which housing 12 is formed from a dielectric, antennas 40 may transmit and receive antenna signals through the dielectric. In configurations in which housing 12 is formed from a conductive material such as metal, slots or other openings may be formed in the metal that are filled with plastic or other dielectric. Antennas 40 may be mounted in alignment with the dielectric (i.e., the dielectric in housing 12 may serve as one or more antenna windows for antennas 40).

Figure 4:
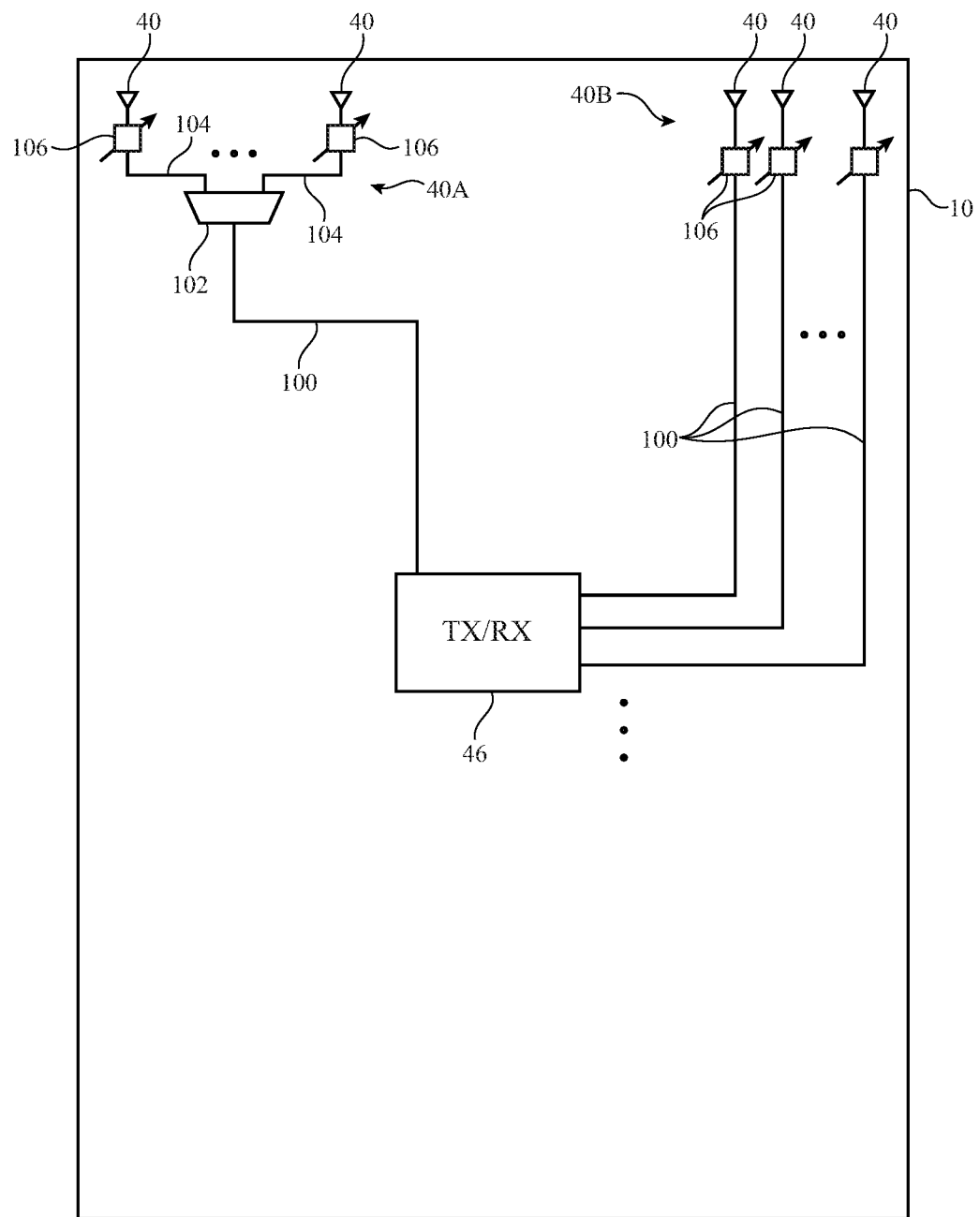
FIG. 4 is a diagram of an illustrative electronic device with wireless circuitry that allows radio-frequency signals to be distributed to phased antenna arrays in accordance with an embodiment.

In devices with multiple phased antenna arrays, signal paths such as paths 100 of FIG. 4 (e.g., transmission lines) may be used to distribute millimeter wave signals to antennas 40. In the example of FIG. 4, wireless transceiver 46 may be used to transmit and receive millimeter wave signals (i.e., radio-frequency signals at RF frequencies such as 60 GHz). Paths 100 may be used to distribute these radio-frequency signals to antenna arrays such as phased antenna arrays 40A and 40B. Gain and phase adjustment circuitry 106 may be used to adjust the signals associated with each antenna 40 in array 40A and to adjust the signals associated with each antenna 40 in array 40B. As shown by the illustrative configuration of array 40B in FIG. 4, paths 100 may include multiple parallel paths 100 each of which is connected between a respective transceiver 46 and a respective antenna 40 in phased antenna array 40B. Gain and phase adjustment circuits 106 may be used to individually adjust the signals associated with each antenna 40 in array 40B (e.g., to perform beam steering). If desired, RF signals (e.g., 60 GHz signals) may be distributed to coupler (splitter) 102 in a phased antenna array such as phased antenna array 40A via a single one of paths 100 and distributed by coupler 102 to respective circuits 106 and antennas 40 in phased antenna array 40A. Received signals may be supplied to path 100 via circuits 106 and coupler 102.

At high RF frequencies (e.g. at 60 GHz or other millimeter wave frequencies), signals can be attenuated on the paths between transceiver circuitry 46 and antennas 40 more strongly than at lower RF frequencies. To help minimize attenuation, it may be desirable to distribute antenna signals within device 10 at intermediate frequencies (IF). The intermediate frequency signals IF in device 10 may, as an example, be signals at 5-15 GHz, whereas the radio-frequency (RF) signals in device 10 may have higher frequencies such as 60 GHz or other millimeter wave frequencies. Internal distribution path attenuation will generally be lower at intermediate frequencies IF than at radio frequencies RF, which may allow the antenna arrays in device 10 to be located farther apart without introducing excessive signal path attenuation.

Figure 5:
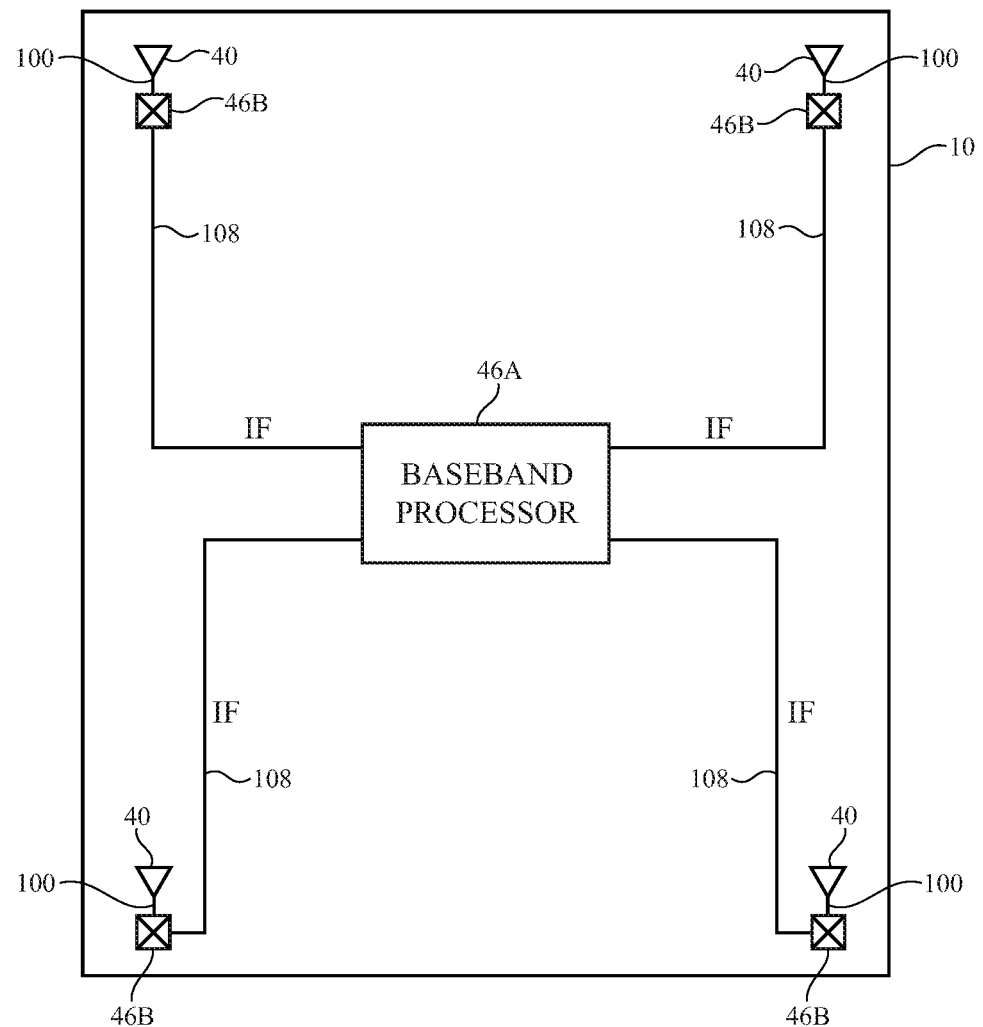
FIG. 5 is a diagram of an illustrative electronic device with wireless circuitry that includes intermediate frequency signal paths for distributing antenna signals within the device in accordance with an embodiment.

An illustrative configuration for device 10 in which signals are distributed at intermediate frequencies is shown in FIG. 5. As shown in FIG. 5, each antenna 40 (e.g., each phased antenna array) in device 10 may be provided with circuitry 46B. Circuitry 46B may include radio-frequency transceiver circuitry (e.g., 60 GHz transceiver circuitry) with upconversion and downconversion capabilities. Each block of circuitry 46B of FIG. 5 may, for example, include an upconverter that upconverts IF signals from baseband processor 46A on an associated one of IF paths 108 to RF signals (e.g., signals at 60 GHz). These RF signals may then be provided to antennas 40 (e.g., phased antenna arrays) via one of RF signal paths 100 and transmitted over the air to a remote millimeter wave receiver. RF signals that are received by each phased antenna array may be supplied to circuitry 46B via a respective path 100. A downconverter in circuitry 46B may then downconvert the received RF signal to an IF signal. An associated one of IF signal paths 108 may be used to convey the IF signal to baseband processor 46A.

Figure 6:
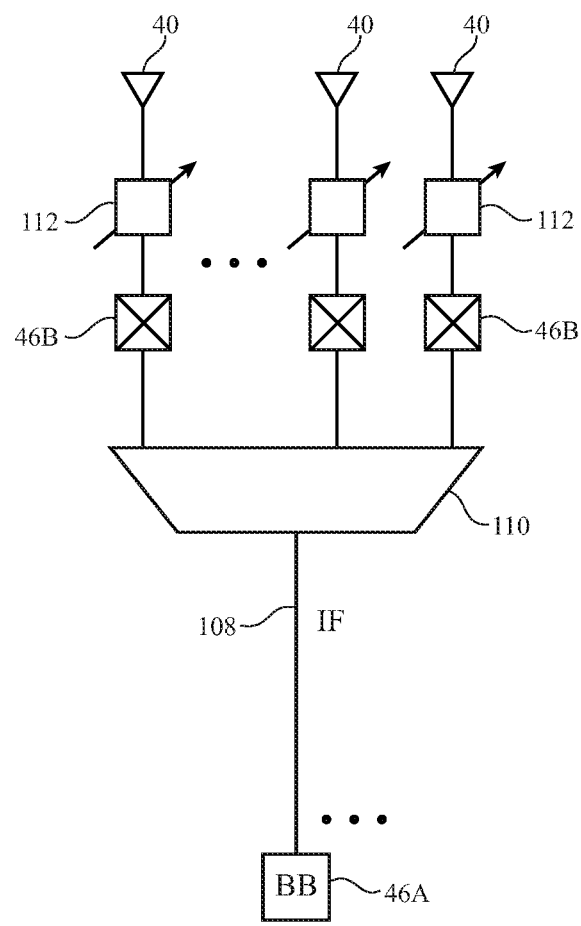
FIG. 6 is a diagram showing how an intermediate frequency signal may be shared among multiple radio-frequency transceivers each of which is coupled to a respective antenna element in a phased antenna array in accordance with an embodiment.

An illustrative circuit diagram for a phased antenna array for device 10 is shown in FIG. 6. In the example of FIG. 6, the phased antenna array has been formed from an array of antennas (antenna elements) 40. Intermediate frequency signals IF may be conveyed to the phased antenna array over intermediate frequency path IF. Coupler (splitter) 110 may provide the IF signals to respective transceiver circuits 46B. An upconverter in each transceiver circuit 46B may upconvert the IF signal to a corresponding RF signal that is provided to a respective antenna element 40 to transmit wirelessly. Each antenna element 40 may be associated with a respective adjustable circuit 112. Each adjustable circuit 112 may include an adjustable gain output amplifier and an adjustable phase shifter for controlling the RF signals supplied from circuit 46B to antenna 40.

Figure 7:
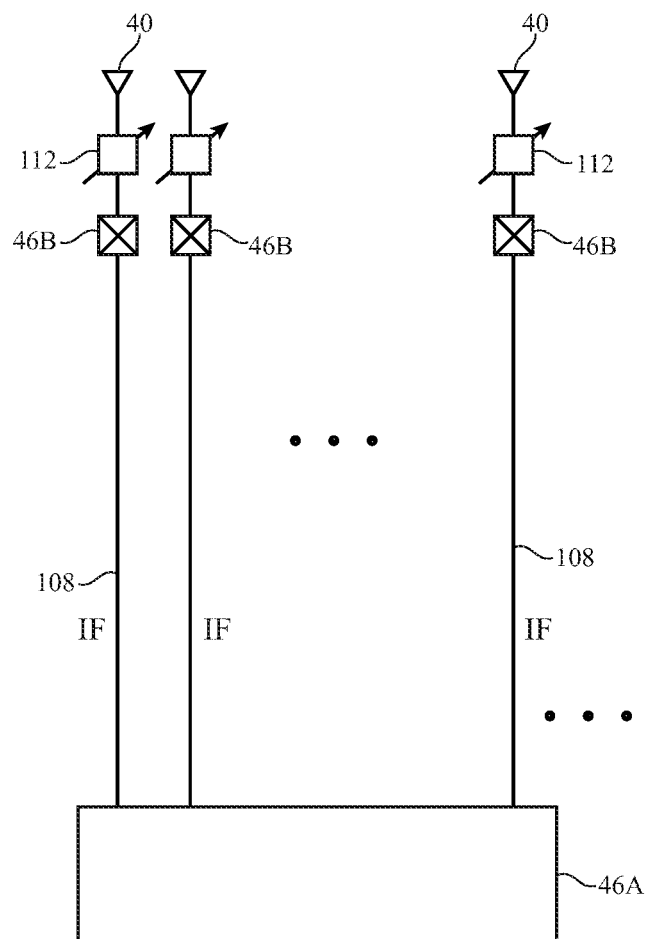
FIG. 7 is a diagram showing how intermediate frequency signals may be distributed individually to each of the antennas in an antenna array over parallel intermediate frequency signal paths in accordance with an embodiment.

Another illustrative arrangement for distributing IF signals to a phased antenna array is shown in FIG. 7. The phased antenna array of FIG. 7 includes an array of antennas 40 each of which is coupled to an associated adjustable circuit 112 (e.g., an adjustable gain amplifier and adjustable phase shifter). Intermediate frequency signals IF may be distributed to transceiver circuits 46B using respective parallel intermediate frequency signal paths 108.

Figure 8:
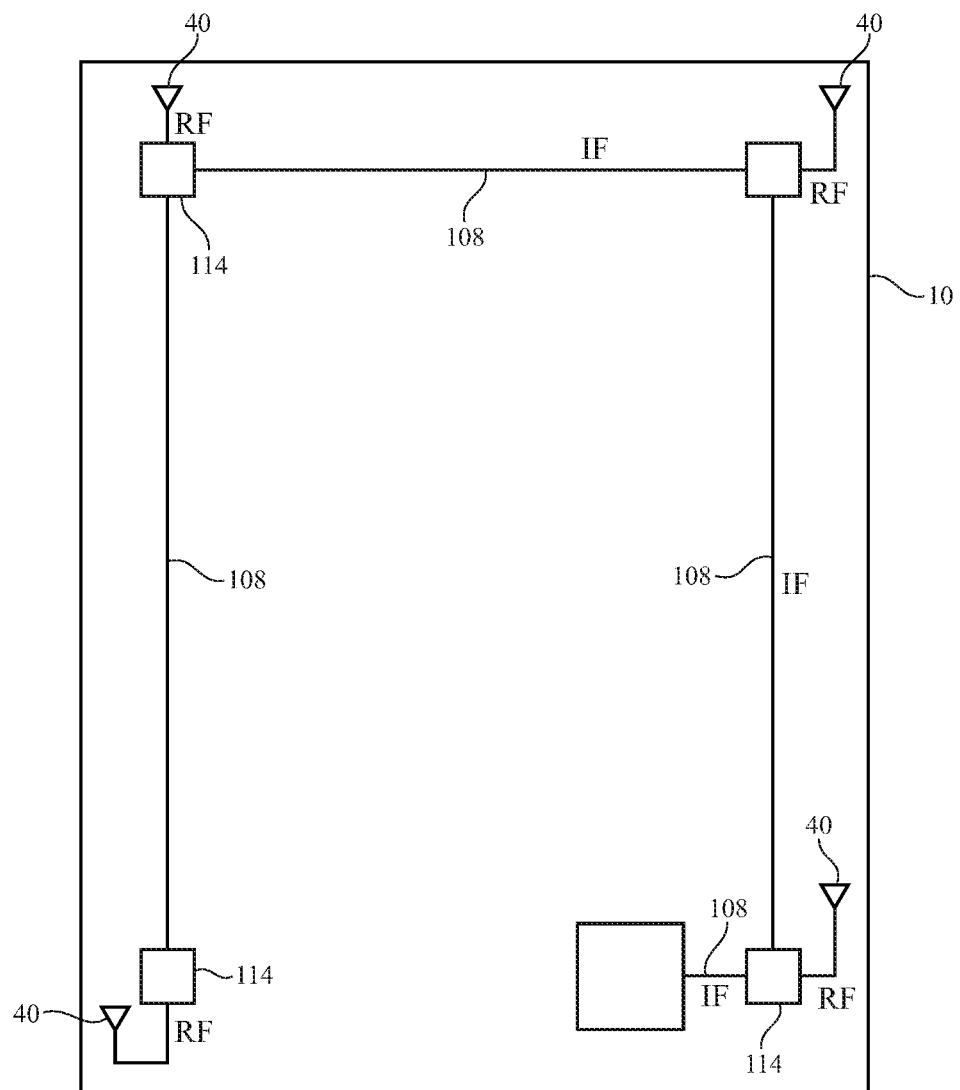
FIG. 8 is a diagram showing how antenna signals may be distributed using a ring-shaped signal distribution topology in accordance with an embodiment.

In the example of FIG. 8, wireless signals (e.g., IF signals) are being distributed using a series of IF signal paths 108 that are coupled in a ring. Each node of the ring has one of circuits 114. Circuits 114 may each include RF transceiver circuitry for transmitting and receiving signals via an associated one of phased antenna arrays 40. Each circuit 114 may include a splitter that splits an incoming IF signal into an outgoing IF signal and a tapped IF signal. An upconverter in each circuit 114 may be used to locally upconvert the tapped IF signal in that circuit 114 so that the signal can be transmitted via the antenna array 40 that is coupled to that circuit. Incoming RF signals that have been received by each antenna array 40 may be received by the RF transceiver circuitry in an associated circuit 114 and downconverted to corresponding IF signals by a downconverter in that circuit 114. Signals paths 108 may be coupled between respective circuits 114 to form a ring-shaped distribution path for IF signals in device 10. If desired, RF signals (e.g., 60 GHz signals) may be distributed using a ring-shaped arrangement of this type. The illustrative configuration of FIG. 8 in which the ring formed from paths 108 is used to distribute IF signals is merely illustrative.

Figure 9:
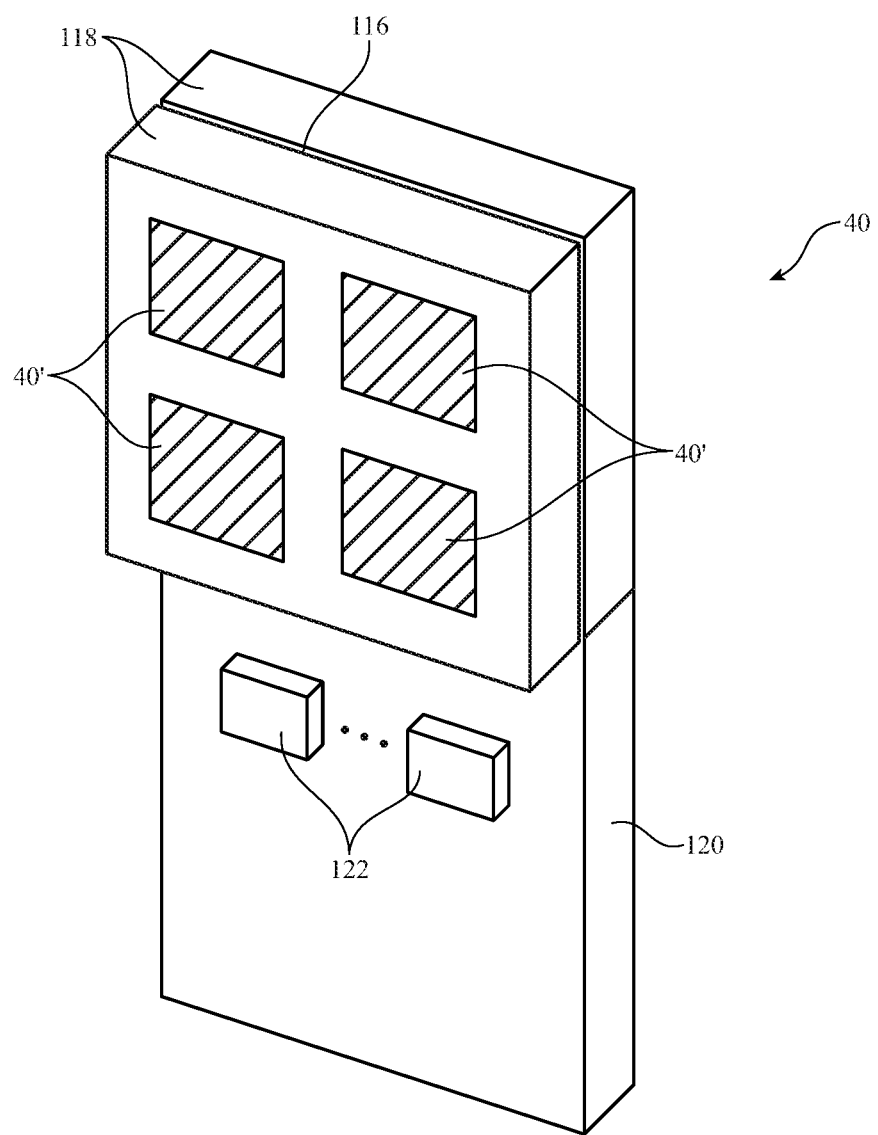
FIG. 9 is a perspective view of an illustrative integrated phased antenna array in accordance with an embodiment.

FIG. 9 is a perspective view of an illustrative phased antenna array of the type that may be used for handling millimeter wave signals (e.g., 60 GHz signals) in device 10. In the configuration of FIG. 9, phased antenna array 40 includes multiple antenna elements 40' (e.g., patch antenna elements). There may be, for example, a square array of four elements 40' on the front face of antenna array 40 and a square array of four elements 40' on the opposing rear face of antenna array 40. The use of a phased array of elements such as elements 40' allows the radio-frequency signals of antenna array 40 to be steered using beam steering techniques. Elements 40' may be formed from metal traces on dielectric substrate layers 118 (e.g., rigid printed circuit board material, ceramic, plastic, glass, or other dielectric). Metal ground layer 116 may be interposed between layers 118 and may serve as a signal reflector. Electrical components 122 (e.g., transceiver circuitry such as circuitry 46B, circuitry 114, etc.) may be mounted on substrate 120. Substrate 120 may be integrated with the other components of array 40. For example substrate 120 may be an extended portion of one or both of layers 118 or may be attached to layers 118 to form an integrated transceiver and antenna array module.

Figure 10:
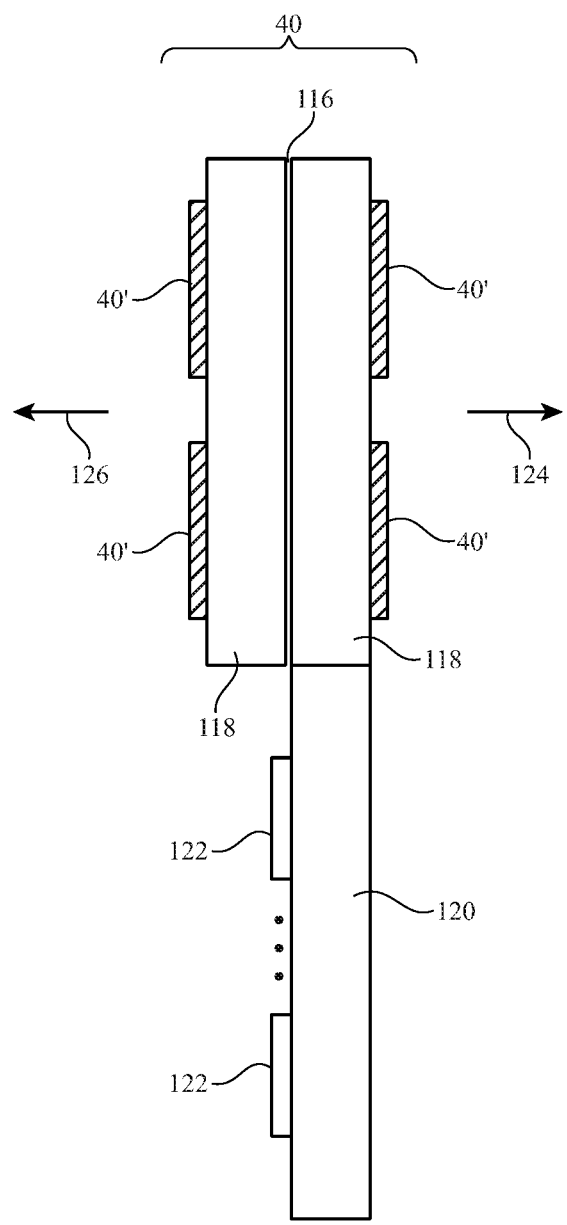
FIG. 10 is a side view of the illustrative integrated phased antenna array of FIG. 9 in accordance with an embodiment.

A cross-sectional side view of phased antenna array 40 of FIG. 9 is shown in FIG. 10. As shown in FIG. 10, antenna elements 40' may be located on opposing sides of ground layer 116. The thickness of layers 118 may be selected to space elements 40' on one side of layers 118 by a half of a wavelength from the elements 40' on the other side of layers 118. During operation, only the elements 40' on a first side of array 40 may be used (e.g., the left side of layers 118 in the orientation of FIG. 10), so that antenna signals may be transmitted in direction 126, only elements 40' on the opposing side of array 40 may be used, so that antenna signals may be transmitted in direction 124, or the elements 40' on both sides of layers 118 may be used (e.g., to simultaneously handle antenna signals on both sides of layers 118).

Figure 11:
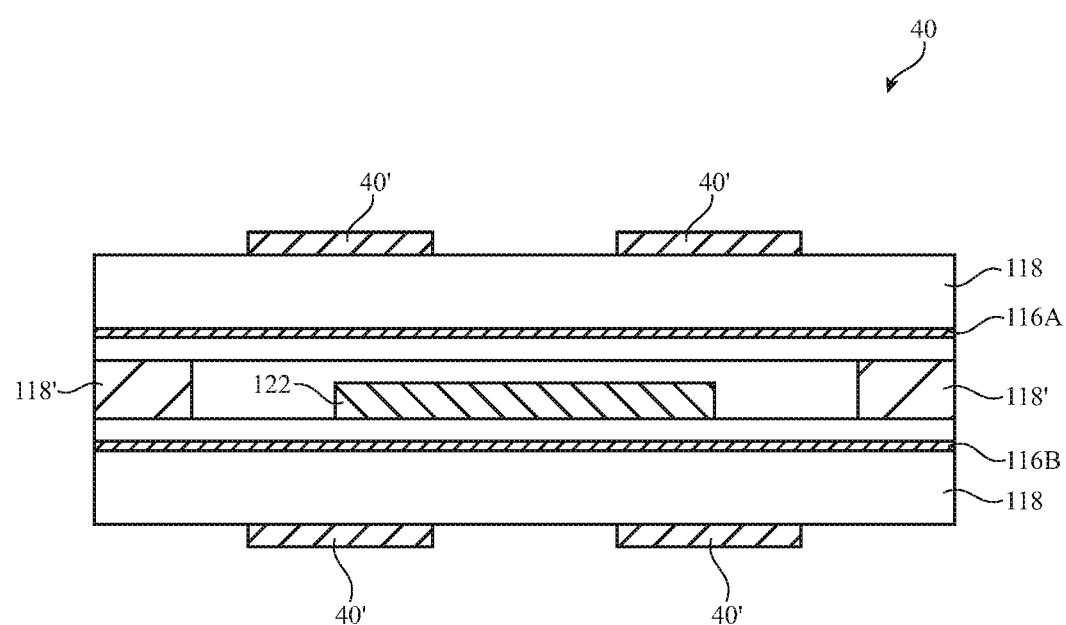
FIG. 11 is a side view of another illustrative integrated phased antenna array in accordance with an embodiment.

If desired, components such as components 122 may be mounted within a cavity formed between two sandwiched substrates 118, as shown in FIG. 11. With this type of arrangement, layers 118 may be attached to each other using dielectric layers 118', thereby forming a system-in-package structure that incorporates both antenna circuitry 122 (e.g., transceiver circuitry 46B, circuits 114, etc.) and antenna elements 40'. Two ground (reflector) layers 116A and 116B may be provided in this type of configuration to help shield components 122 from radio-frequency antenna signals that are being handled by antenna elements 40' on the opposing outer surfaces of array 40.

Figure 12:
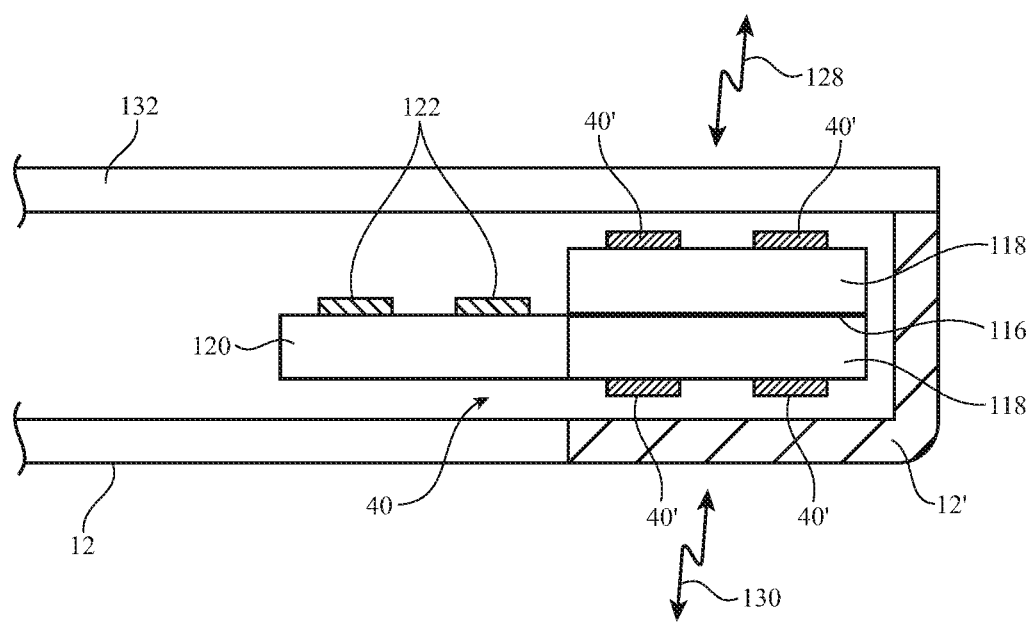
FIG. 12 is a cross-sectional side view of a corner portion of an illustrative electronic device in which a phased antenna array has been mounted in accordance with an embodiment.

FIG. 12 is a cross-sectional side view of a portion of device 10 near one of the corners of housing 12 showing how a phased antenna array such as array 40 of FIGS. 9 and 10 or array 40 of FIG. 11 (e.g., phased antenna array and transceiver modules) may be mounted within device 10. As shown in the illustrative configuration of FIG. 12, antenna array 40 may be mounted so that elements 40' on the top side of array 40 transmit and receive antenna signals 128 through display cover layer 132 (i.e., a glass layer, plastic layer, or other protective dielectric layer for display 14). Elements 40' on the lower side of array 40 may transmit and receive antenna signals 130 through dielectric layer 12'. Layer 12' may be a housing portion such as a dielectric antenna window formed within an opening in a metal housing 12 (as an example).

Figure 13:
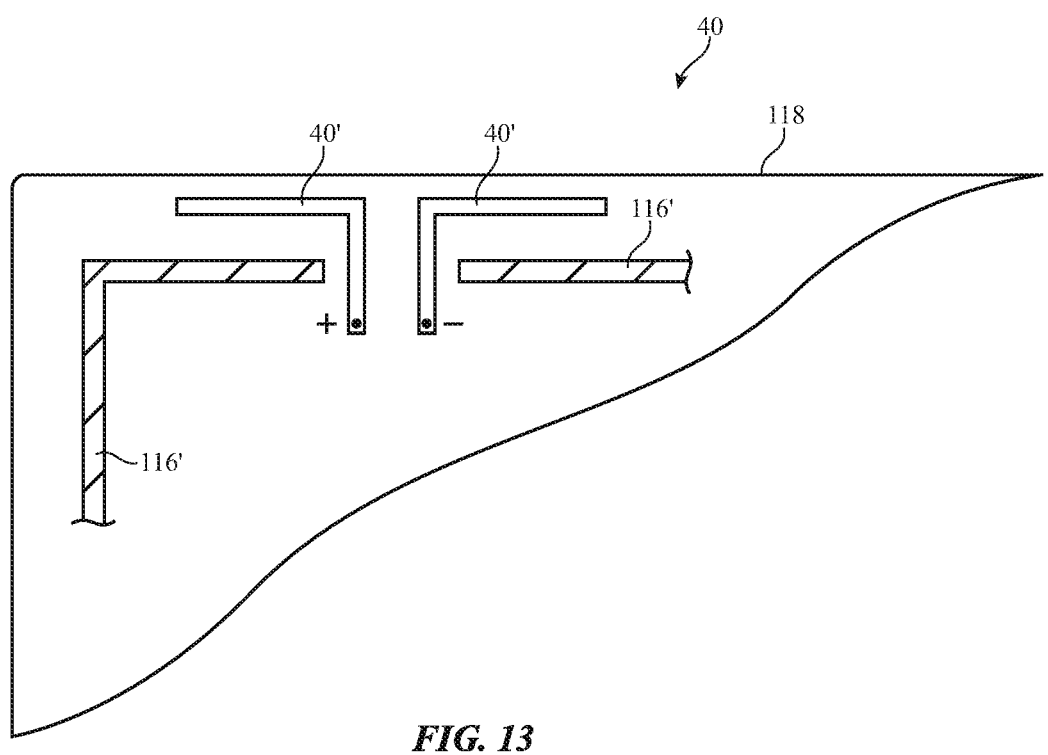
FIG. 13 is a diagram of a portion of a phased antenna array having a dipole antenna in accordance with an embodiment.

As shown in the top view of antenna array 40 in the illustrative arrangement of FIG. 13, antenna array 40 may include a ring-shaped ground reflector such as ground reflector 116'. Dipole antenna elements 40' may protrude through openings in ground ring 116'. In a configuration in which antenna array 40 is mounted in a corner of device 10, two of the edges of antenna array 40 may be adjacent to two respective edges 12E of housing 12. Antenna windows may be formed on these edges (e.g., plastic windows formed in openings in a metal housing). Antenna array 40 may have dipole elements 40' that run along each of these two edges. If desired patch antenna elements (see, e.g., elements 40' of FIGS. 9, 10, and 11) may be included on an antenna array in addition to dipole elements of the type shown in FIG. 13.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a housing having a dielectric housing wall;
a display mounted to the housing;
a first phased antenna array at a first location in the housing;
a second phased antenna array at a second location in the housing, the first and second phased antenna arrays being configured to transmit and receive radio-frequency signals at a frequency greater than 10 GHz through the dielectric housing wall; and
control circuitry configured to:
determine that the first phased antenna array is being blocked by an external object, and
responsive to determining that the first phased antenna array is being blocked by the external object, switch the second phased antenna array into use.

2. The electronic device of claim 1, wherein the control circuitry is further configured to:
responsive to determining that the first phased antenna array is being blocked by the external object, switch the first phased antenna array out of use.

3. The electronic device of claim 1, further comprising:
transceiver circuitry coupled to the first and second phased antenna arrays and configured to transmit radio-frequency signals at a frequency greater than 10 GHz using the first and second phased antenna arrays.

4. The electronic device of claim 3, wherein the transceiver circuitry is configured to receive radio-frequency signals at the frequency greater than 10 GHz using the first and second phased antenna arrays.

5. The electronic device of claim 4, further comprising:
a printed circuit board substrate, wherein the transceiver circuitry and the first phased antenna array are mounted to the printed circuit board substrate.

6. The electronic device of claim 1, further comprising:
sensor circuitry configured to gather sensor data indicative of whether the first phased antenna array is being blocked by the external object, wherein the control circuitry is configured to determine whether the first phased antenna array is being blocked by the external object based on the sensor data gathered by the sensor circuitry.

7. The electronic device of claim 6, wherein the sensor data comprises sensor data selected from the group consisting of: proximity sensor data, antenna impedance measurements, and signal quality measurements.

8. The electronic device of claim 1, wherein the dielectric housing wall opposes the display.

9. The electronic device of claim 8, wherein the housing comprises peripheral conductive housing structures, the dielectric housing wall and the display being mounted to the peripheral conductive housing structures.

10. The electronic device of claim 8, wherein the first and second phased antenna arrays comprise patch antennas.

11. The electronic device of claim 10, wherein the first phased antenna array comprises four patch antennas.

12. The electronic device of claim 11, wherein the second phased antenna array comprises two patch antennas.

13. The electronic device of claim 1, further comprising:
a dielectric layer, wherein the first phased antenna array is on the dielectric layer; and
transceiver circuitry on the dielectric layer and coupled to the first phased antenna array.

14. The electronic device of claim 13, further comprising:
an additional dielectric layer, wherein the second phased antenna array is on the additional dielectric layer.

15. The electronic device of claim 14, further comprising:
additional transceiver circuitry coupled to the second phased antenna array; and
a baseband processor coupled to the transceiver circuitry via a first transmission line path and coupled to the additional transceiver circuitry via a second transmission line path, wherein the baseband processor is configured to receive, from the transceiver circuitry and via the first transmission line path, first intermediate signals corresponding to radio-frequency signals received by the first phased antenna array, the baseband processor being further configured to receive, from the additional transceiver circuitry and via the second transmission line path, second intermediate signals corresponding to radio-frequency signals received by the second phased antenna array.

16. The electronic device of claim 1, wherein the display comprises a touch screen display.

17. An electronic device comprising:
a housing;
a display mounted to the housing;
a first phased antenna array at a first location in the housing;
a second phased antenna array at a second location in the housing;
control circuitry configured to:
 determine that the first phased antenna array is being blocked by an external object, and
 responsive to determining that the first phased antenna array is being blocked by the external object, switch the second phased antenna array into use;
baseband processor circuitry configured to produce intermediate frequency signals;
first transceiver circuitry coupled to the baseband processor circuitry and configured to transmit radio-frequency signals corresponding to the intermediate frequency signals using the first phased antenna array; and
second transceiver circuitry coupled to the baseband processor circuitry and configured to transmit radio-frequency signals corresponding to the intermediate frequency signals using the second phased antenna array, wherein the radio-frequency signals transmitted by the first and second transceiver circuitry are at a frequency greater than 10 GHz.

18. The electronic device of claim 17, wherein the first transceiver circuitry is configured to receive radio-frequency signals at the frequency greater than 10 GHz using the first phased antenna array and the second transceiver circuitry is configured to receive radio-frequency signals at the frequency greater than 10 GHz using the second phased antenna array.

19. An electronic device comprising:
a housing;
a display mounted to the housing;
a first phased antenna array at a first location in the housing;
a second phased antenna array at a second location in the housing;
control circuitry configured to:
 determine that the first phased antenna array is being blocked by an external object, and
 responsive to determining that the first phased antenna array is being blocked by the external object, switch the second phased antenna array into use;
transceiver circuitry coupled to the first and second phased antenna arrays; and
a baseband processor coupled to the transceiver circuitry via a transmission line path, wherein the baseband processor is configured to receive, from the transceiver circuitry and via the transmission line path, intermediate signals corresponding to radio-frequency signals received by the first and second phased antenna arrays.

20. The electronic device of claim 19, further comprising a dielectric layer, wherein the transceiver circuitry and the first phased antenna array are on the dielectric layer.

* * * * *